(12) United States Patent
Mengal et al.

(10) Patent No.: US 7,001,629 B1
(45) Date of Patent: Feb. 21, 2006

(54) METHOD AND PLANT FOR SOLVENT-FREE MICROWAVE EXTRACTION OF NATURAL PRODUCTS

(75) Inventors: Philippe Mengal, Vannes (FR); Bernard Mompon, Vannes (FR)

(73) Assignee: Archimex, Vannes Cedex (FR)

( * ) Notice: Subject to any disclaimer, the term of this patent is extended or adjusted under 35 U.S.C. 154(b) by 847 days.

(21) Appl. No.: 09/102,788

(22) Filed: Jun. 23, 1998

Related U.S. Application Data

(63) Continuation of application No. 08/533,621, filed as application No. PCT/FR94/00551 on May 10, 1994, now abandoned.

(30) Foreign Application Priority Data

May 11, 1993 (FR) .................................. 93 05810

(51) Int. Cl.
*A23L 1/25* (2006.01)
*A01N 65/00* (2006.01)
*F26B 3/34* (2006.01)

(52) U.S. Cl. ...................... 426/241; 426/425; 426/442; 426/472; 424/725; 424/725.1; 435/289.1; 34/263; 34/265

(58) Field of Classification Search ................ 426/241, 426/425, 442, 472; 34/263, 265; 424/725, 424/725.1; 435/289.1
See application file for complete search history.

(56) References Cited

U.S. PATENT DOCUMENTS

| | | | |
|---|---|---|---|
| 4,464,402 A | 8/1984 | Gannon | 426/242 |
| 4,554,132 A | 11/1985 | Collins | 422/68 |
| 4,693,867 A | 9/1987 | Commarmot et al. | 422/64 |
| 5,003,143 A | 3/1991 | Marks et al. | 219/10.55 |
| 5,377,426 A | 1/1995 | Paré | 34/259 |
| 5,458,897 A | 10/1995 | Pare | 426/64 |
| 5,519,947 A | 5/1996 | Paré | 34/263 |
| 5,732,476 A | 3/1998 | Paré | 34/265 |
| 5,884,417 A * | 3/1999 | Pare | |
| 6,027,757 A | 2/2000 | Menon | 426/443 |

FOREIGN PATENT DOCUMENTS

| | | |
|---|---|---|
| AU | A-578313 | 4/1986 |
| EP | A-0398798 | 11/1990 |
| EP | A-0485668 | 5/1992 |

* cited by examiner

*Primary Examiner*—Mary K. Zeman
(74) *Attorney, Agent, or Firm*—Kinney & Lange, P.A.

(57) ABSTRACT

A microwave extraction method involves the steps of placing biological material in an enclosure without any solvent whatsoever and exposing the solvent-free biological material to microwave radiation to free at least some of the natural product, and then separating any residual biological material from the extracted natural product. Additionally, the microwave extraction method involves the steps of applying reduced pressure in the enclosure during the microwave radiation stage and heating the enclosure during at least most of the microwave radiation stage to compensate for the temperature drop resulting from water evaporation from the biological material.

26 Claims, 4 Drawing Sheets

US 7,001,629 B1

METHOD AND PLANT FOR SOLVENT-FREE MICROWAVE EXTRACTION OF NATURAL PRODUCTS

This application is a continuation of application Ser. No. 08/553,621 filed on Nov. 28, 1995, which is a 371 national phase application of PCT/FR94/00551 filed on May 10, 1994.

The invention pertains to the field of the extraction of natural products contained in a biological material and notably but not exclusively the extraction of such products from plant material.

The extraction of natural products from biological material can be done by several methods that may or may not use one or more extraction solvents depending on the nature of the biological material used and of the product or products to be extracted from this material. It will be noted, in this respect, that the name given to an extract is often a function of the technology implemented to achieve the obtaining of this product. Thus, concretes, resinoids, oleoresins etc. which are extracts formed by volatile compounds or waxy, fatty and non-volatile products are conventionally obtained in the presence of at least one organic solvent. Essential oils, formed chiefly by volatile fragrant compounds are, for their part, generally obtained by distillation with water vapor (hydro-distillation) and/or by mechanical methods.

For example, extraction from oil-bearing products and extraction of essential oils from citrus peel and of fish oils is conventionally done by means of physical methods such as crushing and/or expressing without solvent or by hydro-distillation. Apart from the fact that such techniques preserve a low cost of implementation, they have the advantage of making it possible to obtain extraction products (and biological material after extraction), free of solvent residues and therefore not requiring any subsequent treatment for the elimination of such residues.

However, there are many products that cannot be extracted from the natural material containing them by such methods and that require the use of extraction techniques using organic solvents. By means of such techniques, the product to be extracted is diffused in the solvent and dissolves in it. However, it is then necessary to separate the extracted product from the solvent in order to enable the concentration of the extract. Several parameters come into play in the extraction yields achieved in the presence of the solvent, among which the following may be referred to:

the solubility of the product extracted in the chosen solvent, the diffusion of the extracted product within the solid matrix of the biological material used.

It is possible act on the first parameter notably by causing variation in the operational temperature or again in the concentration of the solvent used.

Furthermore, it is also possible to act on the second parameter, either prior to the extraction step or concomitantly with this step. For example, the diffusion of the extracted product could be greatly improved by subjecting the biological material to a preprocessing operation that may consist in particular of a crushing operation, an enzymatic digestion or again a drying operation. It is also possible to decide to act on the biological material during the extraction operation itself, for example by heating it or stirring it. Thus, in the prior art, there are known methods of sonication wherein ultrasound is applied to the mixture formed by the biological material and the solvent in order to further the passage of the extract into the solvent. For, the mechanical waves formed by the ultrasound enable the generation, locally, of a cavitation of the biological material and therefore a heating of this material, furthering the release of the extract.

It has also been proposed, in the prior art, to further the extraction of a product from a biological material by subjecting it to microwave irradiation. The effect of microwaves on biological material is now well known. Such electromagnetic waves are indeed absorbed selectively by media possessing a high dielectric constant and, therefore, in the case of biological material, chiefly by water, i.e. essentially by vascular and glandular tissues and more particularly by vesicles in the case of plant material. During such absorption, the energy of the radiation is converted into calorific energy, thus enabling the selecting heating of the microwave-absorbent parts of the biological material.

The European patent EP 0398798 discloses a technique for the microwave-assisted extraction of products from biological material, comprising the following steps consisting in:

subdividing a biological material (peppermint, lovage, cedar or garlic) possessing a microwave-absorbent dispersed component (water), placing the subdivided material in a solvent that is transparent or partially transparent to microwaves and absorbs fewer microwaves than the dispersed component, such as hexane, ethanol or dichloromethane, exposing the mixture formed by the subdivided material and the solvent to microwaves in order to enable the extraction of the soluble products by heating the subdivided material preferably with the solvent, separating the residual biological material from the solvent, and recovering the extracted product.

Although it has the advantage of improving extraction yields, the technique described in the patent EP 0398798 cannot be used to overcome the already-mentioned drawbacks related to the presence of solvent in the extract obtained.

It will be noted that the extraction of essential oil from a biological material by solvent-free microwave irradiation has already been proposed in the prior art.

The article "Microwave Oven Extraction of an Essential Oil" in the "Flavour and Fragrance Journal", Vol. 4, pp. 43–44, describes a technique for the extraction of essential oil of *Lippia sidoides* by microwave heating, according to which 30–40 gram plant samples are placed, in solvent-free conditions, in a flask inside a microwave oven and undergo microwave irradiation for 5 minutes. The flask used is designed to enable essential oil to be carried along by a flux of air coming from the exterior.

Although such a method enables extraction in a time far shorter than that needed for the efficient performance of the operations of extraction by hydro-distillation, it has the major drawback of requiring a very high energy input to enable extraction, which makes it a method of no economic value.

All the methods for the microwave extraction of natural products by microwaves described in the literature can be applied only to masses of processed biological material that are very small in relation to the power of the microwaves applied. Generally, this power ranges from 10,000 W to 20,000 W per kilogram of biological material. The maximum power of microwave transmitters in the market working at a frequency of 2450 MHz is 6 KW. Consequently, in order that they may be implemented on an industrial scale, these methods have to be adapted to continuous operation so that, at a given point in space, they have a low mass before a moderately powered microwave source.

SUMMARY OF THE INVENTION

An object of the present invention is to propose a method for the microwave extraction of natural products without the drawbacks of prior art methods.

In particular, one of the aims of the invention is to provide such a method enabling solvent-free extraction and hence the obtaining of an extract free of any residue of solvent.

Another aim of the invention is to propose such a method without in any way thereby requiring an excessive input of energy for a given quantity of biological material to be processed.

Another aim of the invention is to propose an installation for the implementation of such a method.

The invention pertains to a method for the microwave extraction of at least one natural product from a biological material, said method consisting in:
placing said biological material in an enclosure without any solvent,
making said biological material present in said enclosure undergo microwave irradiation in order to prompt the evaporation of at least a part of the water contained in said biological material and, consequently, the splitting up of the cellular structures of said biological material so as to enable the release of at least a part of said natural product,
separating the residual biological material from the extracted natural product, said method being characterized in that it comprises the following complementary steps consisting in:
intermittently applying reduced pressure within said enclosure during said step for the application of microwaves in order to further the splitting up of the cellular structures of said biological material induced by the application of the microwaves,
heating said enclosure during at least the essential part of said step for the application of microwaves, in order to compensate for the drop in temperature resulting from the evaporation of water from the biological material,
the combination of said steps for the application of the microwaves, the application of reduced pressure within the enclosure and the heating of the enclosure permitting the hydro-distillation of said natural product by the conveying of this product in the water vapor coming from said biological material.

Such a method can advantageously be implemented on all natural biological materials, whether of animal, plant or microbiological origin, provided that these materials themselves contain at least 30% of water. This method could be used in particular to extract essential oils from plants, tissues of animal origin and especially fish, as well as from algae, micro-algae and possibly even microorganisms. Of course, this biological material, depending on its nature, could be subdivided before being introduced into the enclosure in order to increase its factor of exposure to microwaves.

The method according to the invention enables the hydro-distillation of the product to be extracted not through the water added from the exterior during the performance of the method but through the water contained in the biological material processed. It will be noted, in this respect, that in the context of the present description, this water will be called constitutional water even though it could have been added beforehand to the biological material, when this material is available in dehydrated form, during a rehumidification step.

The method of the invention therefore consists in subjecting the biological material processed to microwave radiation without extractant solvent, enabling the contents of the cells of this material to be ejected. In order to further this phenomenon and with the aim of carrying out the azeotropic conveying of the extracted product, the pressure of the enclosure is reduced. This reduction in pressure enables, firstly, an increase in the mechanical stress exerted on the walls of the cells of the biological material and, secondly, an increase in the volatility of the azeotropic mixture formed by the product to be extracted and the water vapor. According to the invention, the concomitant heating of the enclosure enables compensation for the very rapid drop in temperature resulting from the evaporation of constitutional water under the effect of the lowering of pressure in the enclosure. Such a reduction of temperature is indeed likely to completely mask the action of the microwaves.

The method according to the invention has many advantages.

Apart from the fact that it results in solvents without residual solvent, it also makes it possible, as compared with standard hydro-distillation, to obtain an extract of equivalent composition and equivalent yield in a substantially shorter time. While the periods with standard hydro-distillation are generally in the range of hours, the periods involved for hydro-distillation under reduced pressure according to the invention are in the range of minutes. For certain products, it is thus possible to obtain a given quantity of extract ten times faster than with standard distillation using water vapor.

Furthermore, the method according to the invention consumes far less energy than prior art microwave-assisted extraction methods. For one and the same quantity of biological material processed, the amount of energy implemented in the context of the invention is also smaller than that needed for hydro-distillation. In the context of an operation of hydro-distillation, it is indeed necessary to heat the biological material and the added water whose mass may amount to ten times the mass of biological material.

Finally, it will be noted that the residual biological material obtained at the end of the method takes a dry form since the constitutional water that it contains has been used to convey the extracted product and since the method does not use any external input of water. Consequently, this residual material could easily be broken down by thermal means and hence possibly be recycled as a fuel.

Preferably, said step of the method according to the invention, consisting of the intermittent application of reduced pressure, consists in subjecting the interior of said enclosure to pressure-reduction cycles.

According to one variant of the invention, said step for the separation of the residual biological material from the extract consists in:
refrigerating the water vapor containing said extracted natural product,
decanting the liquid mixture resulting from such refrigeration, and
separating said extracted natural product and the water resulting from such a decantation.

Although another advantage of the invention is that it leads to the obtaining of far less residual water than do the standard methods of hydro-distillation, at least a part of said water resulting from said decantation step is advantageously injected into the enclosure to carry out the hydro-distillation of the natural product remaining in said residue of biological material.

Furthermore, said heating step is preferably conducted at a temperature lower than 100° C. It will be noted that the method could be performed at a temperature advantageously lower than 75° C. in order to enable the extraction of products tending to deteriorate under the effect of heat.

The microwaves used during said step of microwave irradiation advantageously have a frequency at least equal to 300 MHz. However, it will be noted that, in many countries, the use of frequencies is very strictly regulated and that, for example, in France, only frequencies of 915 MHz and 2450 MHz are allowed for microwave-generating industrial equipment.

Furthermore, said step of microwave irradiation will preferably be conducted so as to apply power ranging from about 100 W to about 10,000 W per kilogram of processed product.

According to one variant of implementation of the method, said microwave irradiation step is conducted under the mechanical stirring of said biological material. Such stirring enables an increase in the factor of exposure of the biological material to microwaves.

The invention also relates to an installation for the implementation of such a method, comprising:
- an enclosure provided with means to generate microwaves within said enclosure and having a thermostat-controlled double wall;
- heating means enabling the regulation of the temperature of said thermostat-controlled double wall;
- means enabling a reduction of the pressure inside said enclosure;
- means to recover the extract when it comes out of said enclosure.

Preferably, said means for recovering the extract comprise means to refrigerate the water vapor contained in the extract.

Also preferably, said installation has means to bring about the operation of said means enabling the pressure within the enclosure to be reduced cyclically.

Advantageously, said enclosure is provided with stirring means.

Finally, also advantageously, said installation has means enabling the rerouting of the residual water obtained at said means for the recovery of the extract from within said enclosure.

BRIEF DESCRIPTION OF THE DRAWING

The invention as well as its advantages will be understood more easily from the following description of its exemplary embodiments with reference to the drawings, of which:

FIG. 7 shows the changes in the yield of essential oil of garden sage obtained during the second example of implementation of the method according to the

DETAILED DESCRIPTION OF THE PREFERRED EMBODIMENTS

Figure 1:
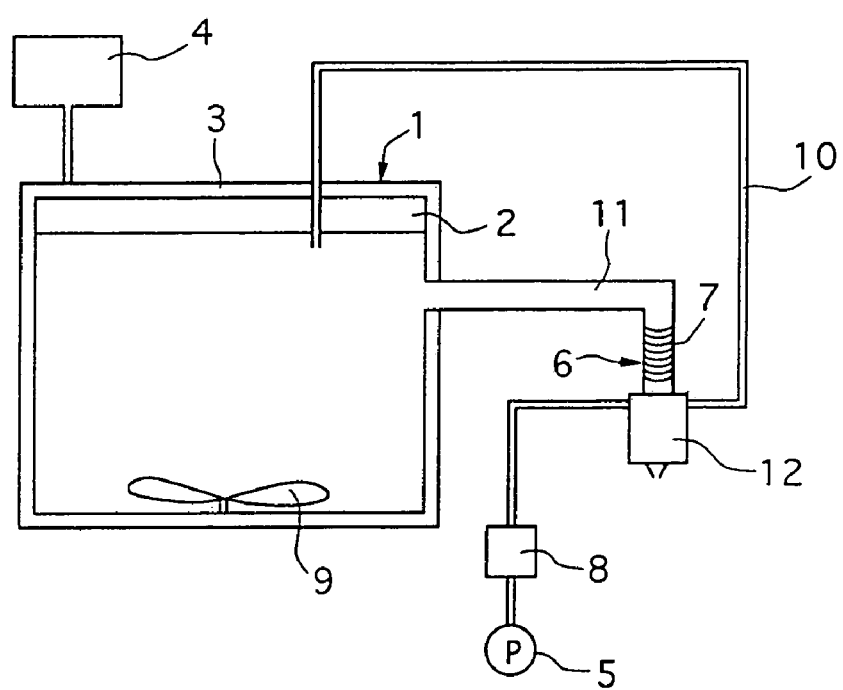
FIG. 1 shows a schematic view of an installation according to the invention.

Referring to FIG. 1, an installation for the extraction of natural products from a biological material is shown schematically. Such an installation has an enclosure 1 equipped with means 2 to generate microwaves in the internal volume that it demarcates.

According to the provisions of the law, these means 2 enable the transmission of microwaves having a frequency equal to 2450 MHz. (It will be noted that it would also have been possible to use a generator of microwaves at a frequency of 915 MHz, this other frequency being also permitted in France.)

The enclosure 1 is furthermore provided in its lower part with stirring means 9 formed by a three-blade turbine enabling the stirring of the biological material during its presence within the enclosure 1, when it is subjected to the action of the microwaves.

Such stirring makes it possible to increase the exposure of the biological material to the microwaves and to prevent certain parts of this material from being irradiated to a degree that is insufficient for the efficient performance of the extraction operation.

According to the present invention, the enclosure 1 is connected firstly with means 5 enabling the reduction of the pressure prevailing within it and, secondly, with means 6 for the recovery of the natural product extracted through the effect of the microwaves on the biological material. The means 5 enabling the pressure to be reduced in the enclosure may be formed by any means conventionally used with the effect of creating a partial vacuum within an enclosure, such as for example a pump or a glass filter pump. In the context of the present invention, the means 6 for the recovery of the extracted product have a conduit 11 installed in the upper part of the enclosure 1 around which there are provided refrigeration means 7 formed by a winding tube in which there flows a cooling liquid.

The conduit 11 enables the recovery of the vapors that result from the effect of the microwaves on the biological material and in which there is the essential oil. Through the refrigeration means 7, these water vapors are condensed. A decanter 12 is provided at the outlet of the conduit 11 to recover these condensed vapors and separate the essential oil. The remaining residual water, after decantation, is advantageously re-routed by a conduit 10 into an enclosure 1 where it is recycled to complete the extraction.

In order to enable a heating of the enclosure 1 to compensate for the reduction in temperature resulting from the lowering of the pressure caused by the vacuum pump 5, the enclosure 1 has a thermostat-controlled double wall 3 connected to heating means 4.

The installation described here above has been used to implement the microwave extraction method of the present invention in order to extract essential oils of peppermint (Examples 1) and garden sage (Example 3).

EXAMPLE 1

A kilogram of peppermint (*Mentha piperita* L., Hungarian variety) with 15% of dry matter was placed within the enclosure 1. The heating means 4 were set in such a way that the thermostat-controlled wall 3 induced a temperature of about 70° C. within the enclosure 1 and the stirring means 9 were applied so as to have a speed of 40 rpm.

The power put out by the microwave generation means 2 is 1150 W and the power reflected varies between 170 W and 220 W. During the extraction operation, which lasted 15 minutes, the power actually absorbed was therefore 930 to 980 W.

During the extraction, the pump 5 was used to lower the pressure to 250 mb. This reduction of pressure was effected after 5 minutes, 10 minutes and 13 minutes.

Furthermore, the temperature of the refrigeration medium flowing in the winding tube 7 was set at 5° C. so as to prompt the condensation of the vapors resulting from the effect of the microwaves on the peppermint and containing the essential oil.

Figure 2:
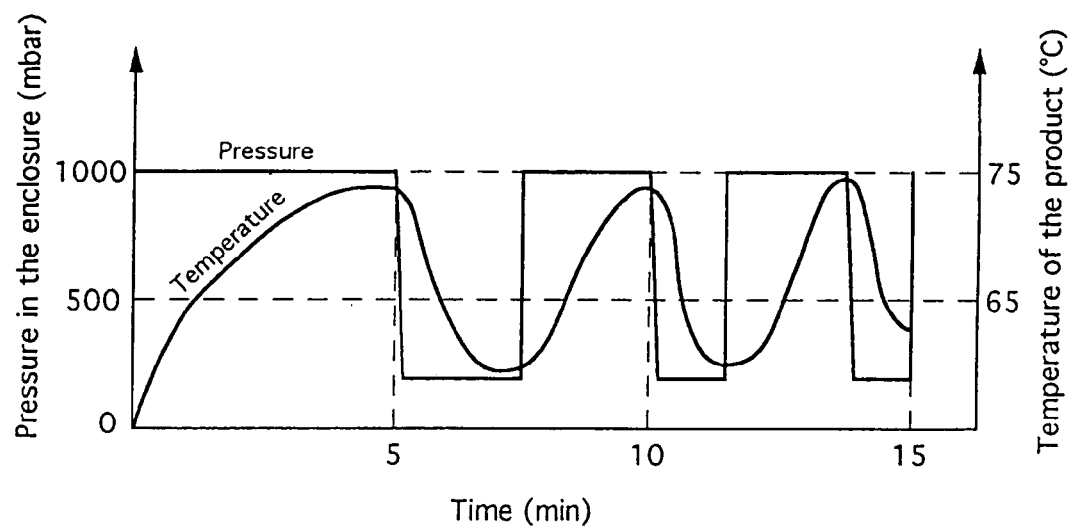
FIG. 2 represents the changes in the pressure of the enclosure and the temperature of the biological material in the context of a first example of the implementation of the method according to the invention, with the installation shown schematically in FIG. 1, for the extraction of essential oil of peppermint.

The changes in the temperature of the mint present in the enclosure and in the pressure prevailing within this enclosure is shown in FIG. 2. Under the effect of the microwaves, the temperature of the product swiftly goes from ambient temperature to 75° C. As soon as the interior of the enclosure is placed under partial vacuum (250 mg) by means of the pump 5, the temperature drops. This drop in temperature is swiftly compensated for by means of the heating of the enclosure so as not to mask the effect of the microwaves.

Figure 3:
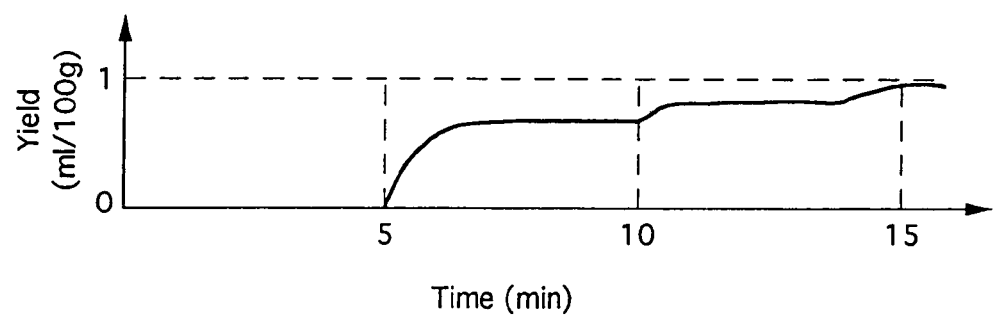
FIG. 3 shows the changes in the yield of essential oil of peppermint obtained during the first exemplary implementation of the method.

Referring to FIG. 3, after 15 minutes of extraction and three cycles of pressure reduction, 1.52 ml of essential oil was recovered (giving a yield of 1.01 ml for 100 g of dry matter).

All that could be obtained through the hydro-distillation of the peppermint residue resulting from a microwave extraction operation such as this was less than 50 mg of essential oil. The method according to the invention therefore makes it possible to obtain an essential oil yield approaching the level of exhaustion of the biological material.

The comparison of the gas-chromatography profiles of two essential oils obtained by the extraction method according to the invention and by the standard method of hydro-distillation does not reveal any major differences in composition.

EXAMPLE 2

The same quantity of peppermint as in the example 1 was processed under the same operating conditions as in example 1 but by making the pump 2 work continuously in such a way that the pressure prevailing within the enclosure 1 was set at 250 mb throughout the extraction operation.

Figure 4:
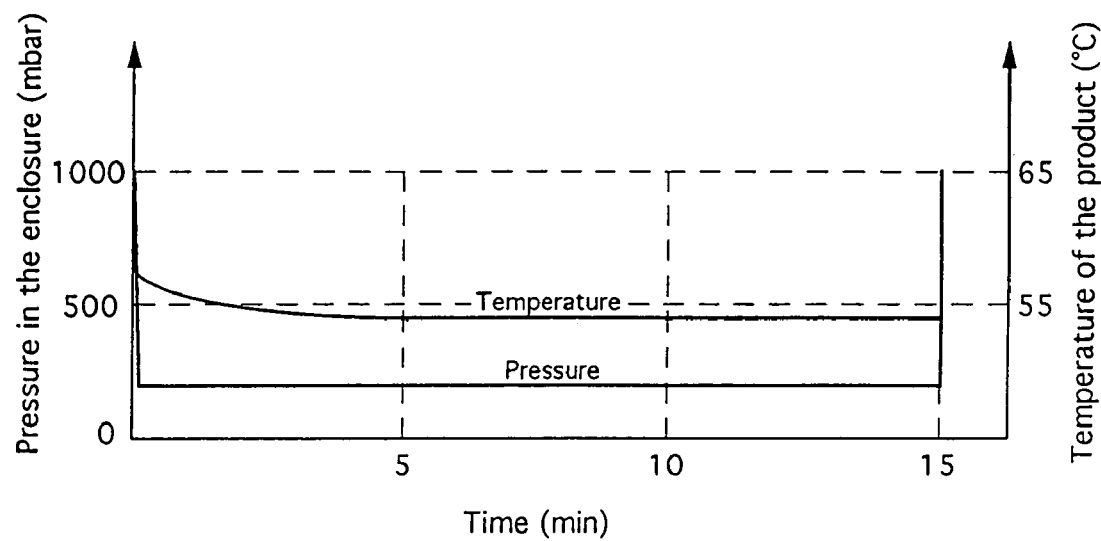
FIG. 4 represents the changes in the pressure of the enclosure and in the temperature of the biological material, in the context of a comparative example of the extraction of essential oil of peppermint.

The changes in the temperature of the mint and in the pressure in the enclosure are given in FIG. 4.

Figure 5:
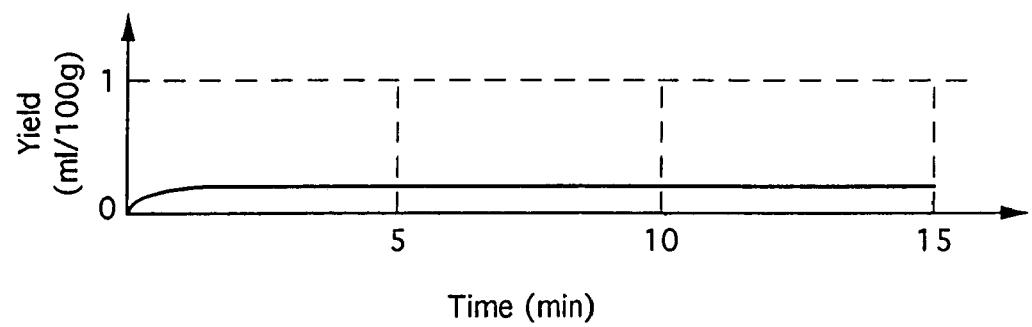
FIG. 5 shows the changes in the yield of essential oil of peppermint obtained during the comparative example.

Referring to FIG. 5, the essential oil yield was then only 0.2 ml for 100 g, namely five times less than in the example 1. A quantity of 1150 mg of essential oil was recovered from the residue of mint after the extraction operation. These results showed the importance of the intermittent character that must be given, according to the invention, to pressure reduction inside the enclosure.

EXAMPLE 3

Five hundred grams of garden sage (*Salvia officinalis* L.) having 25% of dry matter was placed inside the enclosure 1. The heating means 4 were set so that the thermostat-controlled wall 3 induced a temperature of about 70° C. within the enclosure 1 and the stirring means 9 were applied so as to have a speed of 40 rpm.

The power put out by the microwave generation means 2 is 1000 W and the power reflected varies between 150 W and 200 W. During the extraction operation, which lasted 10 minutes, the power actually absorbed was therefore 800 to 850 W.

During the extraction, the pump 5 was used to lower the pressure to 250 mb. This reduction of pressure was effected after 3.5 minutes and 7 minutes.

Furthermore, the temperature of the refrigeration medium flowing in the winding tube 7 was set at 7° C. so as to prompt the condensation of the vapors resulting from the effect of the microwaves on the peppermint and containing the essential oil.

Figure 6:
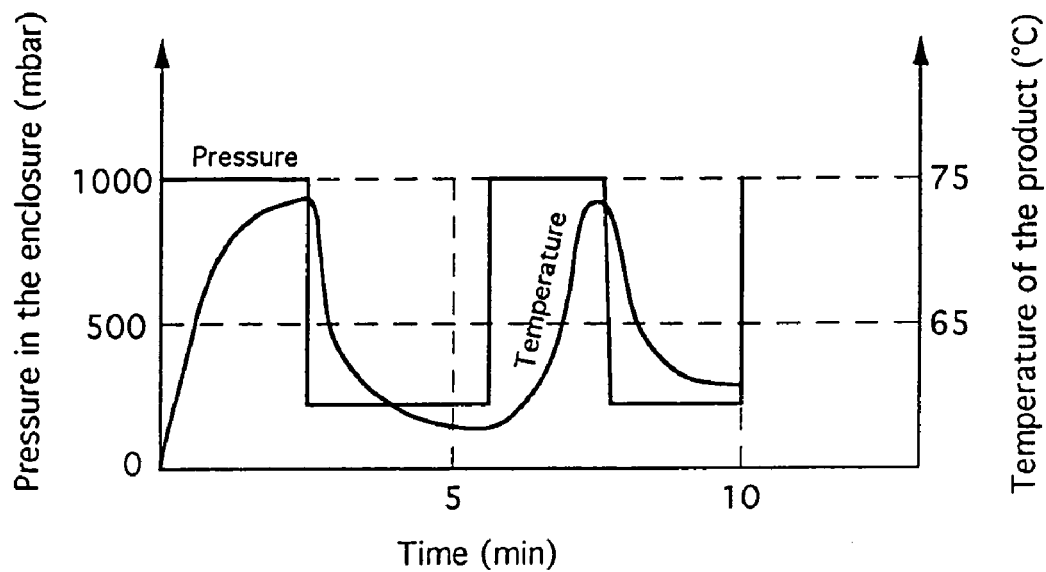
FIG. 6 represents the changes in the pressure of the enclosure and of the temperature of the biological material, in the context of a second example of the implementation of the method according to the invention for the extraction of essential oil of garden sage.

The changes in the temperature of the sage present in the enclosure and in the pressure prevailing within this enclosure is shown in FIG. 6.

Figure 7:
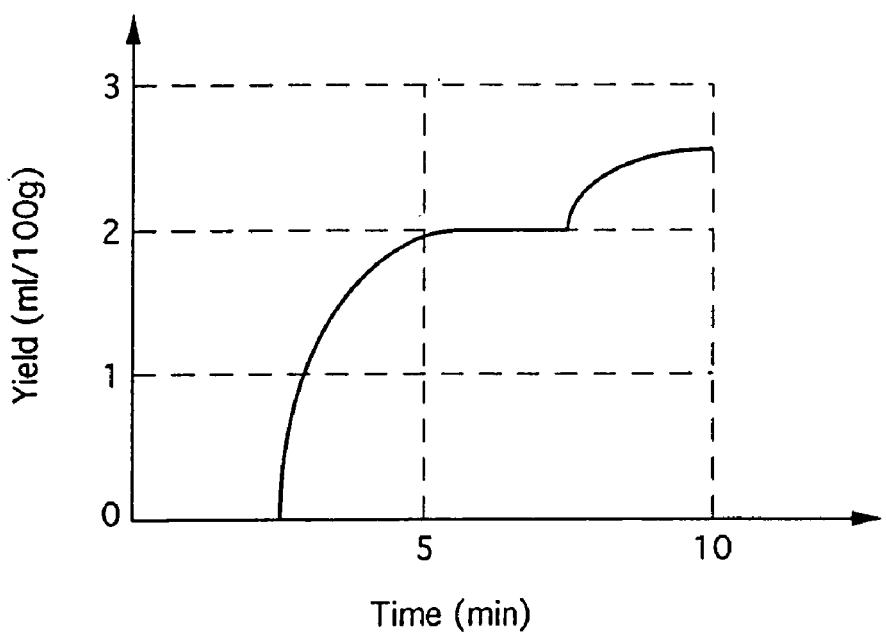

Referring to FIG. 7, after 10 minutes of extraction and two cycles of pressure reduction, 3.06 ml of essential oil was recovered (giving a yield of 2.55 ml for 100 g of dry matter).

The theoretical yield by standard hydro-distillation from the same quantity of sage is 2.77 ml for 100 g, which shows that the implementation of the method according to the invention enabled the recovery of more than 90% of the essential oil of the garden sage treated.

The exemplary embodiments of the invention described herein are not designed to reduce its scope. In particular, it is possible to envisage making the microwaves act for a longer or shorter period of time, using different microwave frequencies or separating the extract from the vapor according to a technique other than the one described without departing from the framework of the invention.

What is claimed is:

1. A method for the microwave extraction of a natural product from a biological material, said method comprising:
    placing said biological material in an enclosure without any solvent;
    applying microwave radiation to said biological material present in said enclosure, the microwave radiation effective to evaporate at least a part of the water contained in said biological material and the microwave radiation effective to split the cellular structure of said biological material and enable the release of at least a part of said natural product;
    intermittently applying reduced pressure within said enclosure during the application of microwave radiation to further the splitting up of the cellular structure of said biological material induced by application of the microwave radiation;
    heating said enclosure during at least a portion of the microwave radiation application to compensate for the drop in temperature resulting from evaporation of water from the biological material, wherein applying microwave radiation to said biological material, intermittently applying reduced pressure, and heating said enclosure causes hydro-distillation of the natural product by conveying the natural product in water vapor coming from the biological material; and
    separating a residual biological material from the natural product.

2. Method according to claim 1, intermittently applying reduced pressure comprises subjecting an interior of said enclosure to pressure-reduction cycles.

3. Method according to claim 1, wherein separating the residual biological material from the extracted natural product comprises:
   refrigerating the water vapor containing said extracted natural product;
   decanting the liquid mixture resulting from such refrigeration; and
   separating said extracted natural product and the water resulting from such a decantation.

4. Method according to claim 3, wherein at least a part of said water resulting from decantation step is injected into the enclosure to carry out the hydro-distillation of the natural product remaining in said residue of biological material.

5. Method according to claim 1, wherein said heating step is conducted at a temperature lower than 100° C.

6. Method according to claim 1, the method further comprising mechanically stirring said biological material during application of the microwave radiation.

7. Apparatus for the implementation of claim 1, the apparatus comprising:
   an enclosure having a thermostat-controlled double wall;
   means to generate microwave radiation within said enclosure;
   heating means enabling the temperature of said thermostat-controlled double wall to be regulated;
   means enabling the pressure inside said enclosure to be reduced; and
   means to recover the extract when the extract comes out of said enclosure.

8. Apparatus according to claim 7, and further comprising means for cyclically operating said means enabling the pressure within the enclosure to be reduced.

9. The method of claim 1 wherein the biological material consists essentially of plant material.

10. The method of claim 1 wherein the extracted natural product consists essentially of essential oils, the essential oils essentially insoluble in water.

11. A method for the solvent-free extraction of at least one extracted natural product from a biological material, the method comprising:
   subjecting the biological material to microwave irradiation;
   intermittently applying a vacuum to the biological material;
   heating the biological material, wherein subjecting the biological material to microwave radiation, intermittently applying a vacuum to the biological material, and heating the biological material causes evaporation of at least a portion of water contained in the biological material and splits the cellular structure of the biological material and thereby releases a portion of the natural product; and
   separating the released portion of the natural product from the biological material.

12. The method of claim 11 wherein separating the released portion from the biological material comprises:
   cooling the released portion;
   decanting a liquid mixture produced by cooling the released portion; and separating the extracted natural product and water resulting from decantation.

13. The method of claim 12, the method further comprising injecting at least a portion of the water resulting from recantation back into the biological material.

14. The method of claim 11, and further comprising stirring the biological material during microwave irradiation of the biological material.

15. A method of separating a natural product from a biological material, the method comprising:
   placing the biological material in an enclosure, the biological material containing water, the enclosure essentially free of liquid water other than the water contained in the biological material, and the enclosure free of organic solvent;
   releasing at least part of the natural product from the biological material by applying microwave radiation to the biological material, the microwave radiation effective to evaporate at least part of the water contained in the biological material to form water vapor and the microwave radiation effective to split the cellular structure of the biological material;
   intermittently applying reduced pressure within the enclosure during the application of microwave radiation to further split the cellular structure of the biological material induced by application of the microwave radiation;
   hydrodistilling the natural product by conveying the natural product and the water vapor coming from the biological material as an azeotropic mixture; and
   separating the natural product from the azeotropic mixture.

16. The method of claim 15, wherein the biological material consists essentially of plant material.

17. The method of claim 15, wherein intermittently applying reduced pressure comprises subjecting an interior of the enclosure to a pressure-reduction cycle.

18. The method of claim 15, the method further comprising:
   heating the enclosure during at least a portion of the microwave radiation application to compensate for a drop in temperature resulting from evaporation of water from the biological material.

19. The method of claim 18 wherein said heating step is conducted at a temperature lower than 100° C.

20. The method of claim 15, wherein separating the natural product from the azeotropic mixture comprises:
   refrigerating the azeotropic mixture to form a liquid mixture, the liquid mixture comprising the natural product; and
   separating the natural product from the liquid mixture.

21. The method of claim 20, wherein the liquid mixture further comprises condensed water vapor, the method further comprising:
   separating the condensed water vapor from the liquid mixture; and
   injecting at least some of the condensed water vapor that is separated from the liquid mixture into the enclosure to supplement hydrodistillation of the natural product.

22. The method of claim 15, the method further comprising stirring the biological material during application of the microwave radiation.

23. A method of separating a natural product from a biological material, the method comprising:
   placing the biological material in an enclosure, the biological material containing water;
   releasing at least part of the natural product from the biological material by applying microwave radiation to the biological material, the microwave radiation effective to evaporate at least part of the water contained in the biological material to form water vapor and thereby split the cellular structures of the biological material;

intermittently applying reduced pressure within the enclosure during the application of microwave radiation to further split the cellular structure of the biological material induced by application of the microwave radiation;

conveying the natural product and the water vapor coming from the biological material as an azeotropic mixture; and separating the natural product from the azeotropic mixture.

24. The method of claim 23 wherein the biological material consists essentially of plant material.

25. A method of separating a natural product from a biological material, the method comprising:

placing the biological material in an enclosure, the biological material containing water;

releasing at least part of the natural product from the biological material by applying microwave radiation to the biological material, the microwave radiation effective to evaporate at least part of the water contained in the biological material to form water vapor and thereby split the cellular structure of the biological material;

heating the enclosure during at least a portion of the microwave radiation application to compensate for a drop in temperature resulting from evaporation of water from the biological material;

conveying the natural product and the water vapor coming from the biological material as an azeotropic mixture; and separating the natural product from the azeotropic mixture.

26. The method of claim 25 wherein the biological material consists essentially of plant material.

* * * * *

UNITED STATES PATENT AND TRADEMARK OFFICE
CERTIFICATE OF CORRECTION

PATENT NO. : 7,001,629 B1
APPLICATION NO. : 09/102788
DATED : February 21, 2006
INVENTOR(S) : Phillippe Mengal et al.

It is certified that error appears in the above-identified patent and that said Letters Patent is hereby corrected as shown below:

Column 9, Line 1, delete "claim 1, intermittently", insert --claim 1, wherein intermittently--

Signed and Sealed this

Twenty-sixth Day of December, 2006

JON W. DUDAS
*Director of the United States Patent and Trademark Office*